Oct. 11, 1955             W. N. TITUS             2,720,197
HEAT EXCHANGER FOR FUEL FLOWING FROM THE CARBURETOR
OF AN INTERNAL COMBUSTION ENGINE
Filed Oct. 22, 1952             2 Sheets-Sheet 1
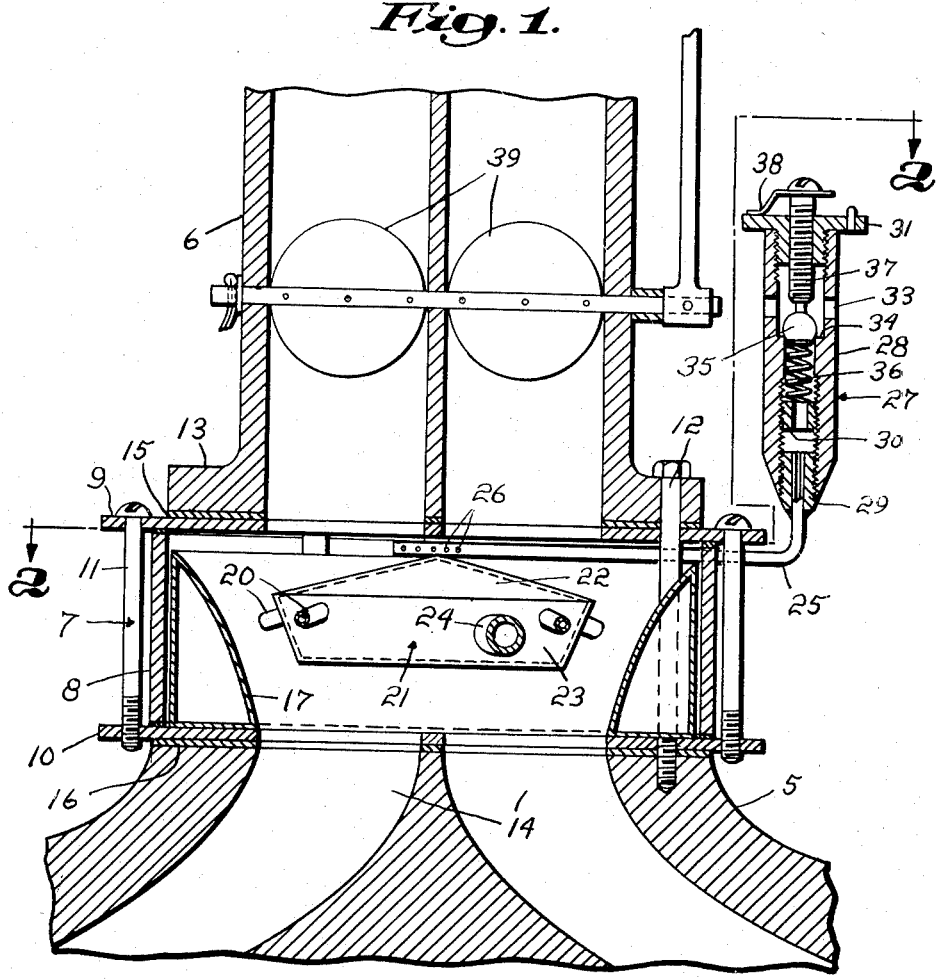

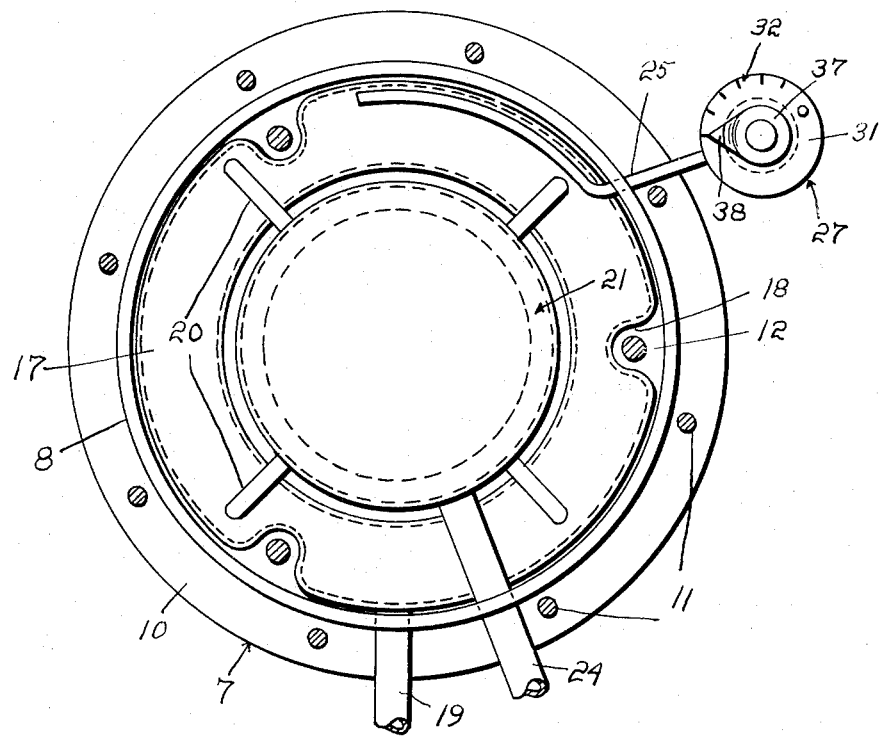

United States Patent Office 2,720,197
Patented Oct. 11, 1955

2,720,197

HEAT EXCHANGER FOR FUEL FLOWING FROM THE CARBURETOR OF AN INTERNAL COMBUSTION ENGINE

William N. Titus, Gardiner, Maine

Application October 22, 1952, Serial No. 316,149

6 Claims. (Cl. 123—122)

The present invention relates to heat exchangers, each to be located between the intake manifold of an internal combustion engine, and particularly those that are liquid cooled, and the carburetor thereof with vaporizing heat for the mixture passing through it being supplied by the circulation of the engine heated coolant.

In the supplying of the fuel mixture to the cylinder, carburetors have a difficult task because of the wide range of temperatures under which they must be capable of operating. While it is generally recognized that gasoline mileage depends on proper carburetor adjustment, it is equally true that gasoline mileage and engine performance generally are dependent on the extent to which the gasoline is vaporized on its way to the cylinders.

The objective of this invention is to provide means by which the gasoline is more perfectly vaporized before it reaches the intake manifold from the carburetor and to ensure automatically that there is a mixture of air and gasoline vapors reaching the cylinder uniformly that will ensure best engine operation under all conditions.

In accordance with the invention, there is provided a heat exchanger for location between the carburetor and the intake manifold providing an expansion chamber through which the mixture flows and in which it is brought into contact with surfaces heated as by the circulation of the coolant in the cooling system. The invention also provides means for admitting air into the expansion chamber with such additional air being automatically taken in or increased when the intake pressure, measured in inches of vacuum, drops.

In the accompanying drawings, there is shown an illustrative embodiment of the invention from which these and other of its objectives, novel features, and advantages will be readily understood. In the drawings:

Fig. 1 is a section taken through a heat exchanger in accordance with the invention and through the intake manifold and carburetor between which it is located, and Fig. 2 is a section taken along the indicated lines 2—2 of Fig. 1.

In Fig. 1 there is shown a fragment of the intake manifold 5 of an internal combustion engine between which and the carburetor 6, indicated as being of the dual throat type, is a heat exchanger in accordance with the invention.

The heat exchanger has a hollow body, generally indicated at 7, and shown as consisting of a cylindrical wall 8 and end plates 9 and 10 clamped against the gasketed ends thereof by assembly bolts 11. The body 7 is secured by bolts 12 which extend through the carburetor flange 13, the body 7, and into the intake manifold 5, whose ports are indicated at 14. A gasket 15 is disposed between the plate 9 and the flanged end of the carburetor 6 and a gasket 16 is interposed between the plate 10 and the face of the manifold 5 to which the heat exchanger and carburetor are bolted.

Fitting within the body 7 is an annular container 17 which is shown as having its inner wall inclined inwardly towards the manifold ports 14 and having its outer surface recessed as at 18 to accommodate the bolts 12. This conduit has a pipe 19 extending through the wall 8 and pipes 20 which effect communication between and also serve to support a container, generally indicated at 21, centrally of the body 7. The container 21 is shown as having a conical part 22 whose apex is disposed towards the carburetor 6 and a part 23 of frusto-conical shape disposed towards but spaced a substantial distance from the manifold ports 14. The container 21 has a pipe 24 extending through the body wall 8.

The pipes 19 and 24 are connected to the circulating system of the engine so that the coolant, heated by the engine, will flow through the containers to heat their surfaces so that fuel passing to the manifold 5 from the carburetor 6 will be heated and satisfactorily vaporized. In practise, the pipe 24 is connected to receive coolant from the engine block, not shown, and hence is the inlet pipe and the pipe 19 is connected to the top of the radiator, not shown, and hence is the outlet.

The mixture of gasoline and air from the carburetor 6 impinges against the conical part 22 and then against the inclined inner wall of the container 17 thus to ensure effective and efficient vaporization of the mixture by contact with surfaces heated by the flow of the coolant therethrough which coolant is, typically, at a temperature of 160° to 180° F.

As such vaporization is attended by expansion, a heat exchanger in accordance with the invention is preferably so proportioned that the chamber established by the space above and below the container 21 and between it and the container 17 has several times the capacity of the carburetor or manifold bores. This chamber will sometimes be referred to as the expansion chamber.

Because of the expansion of the mixture in the heat exchanger, best results are obtained by admitting air into the expansion chamber as by an air intake pipe 25 having air outlet openings 26 in the zone of the apex of the container 21 and having its intake end controlled by the valve 27.

For such uses, the valve detailed in the drawings has proved effective and is shown as consisting of a tubular body 28 threaded at one end to receive the fitting 29 on the pipe 25 and the adjustable sleeve 30. The body 28 is threaded at its other end to receive the cap 31 shown as provided with indicia as at 32. Between said threaded portions, there are air intake ports 33 and a seat 34 for the valve element 35. The valve element 35 is urged in an unseating direction by the spring 36 backed by the sleeve 30 with movements in that direction being limited by the adjustable stop 37 threaded through the cap 31 and provided with an arm 38 which traverses the indicia 32.

The valve 27 is adapted to be maintained closed against the action of the spring 36 by suction. For example, when the carburetor throttle valves 39 are closed to idling position, a vacuum of approximately 20 inches exists in the intake manifold 5. Opening of the valves 39 is attended by a drop in the vacuum to, say, 15 inches and the valve 27 is adjusted, for example, so that its spring 36 is then effective to raise the valve element 35 from its seat to the extent permitted by the stop 37. The valve 27 may, obviously, be adjusted to open on any other drop and close on any predetermined rise in vacuum that provides most satisfactory operation.

From the foregoing, it will be appreciated that heat exchangers, in accordance with the invention, are well adapted to meet their objectives. Under usual conditions, the mixture from the carburetor of most internal combustion engines contains gasoline droplets with considerable reliance being placed on the heat of the intake manifold to effect more complete vaporization of the gasoline before it reaches the cylinders. Even under favorable conditions, the mixture is not suitably vaporized and under winter conditions, fuel vaporization is even less efficiently effected.

In accordance with the invention, the mixture is expanded and thoroughly vaporized by contact with the heated surfaces of the expansion chamber and additional air is added automatically when needed to ensure a proper mixture. As a consequence, the invention ensures much better engine performance at all seasons of the year as measured by such criteria as faster pick-up, increased gasoline mileage, reduction in carbon monoxide, and smoother operation.

What I therefore claim and desire to secure by Letters Patent is:

1. A heat exchanger to be located between the carburetor and intake manifold of an internal combustion engine, said heat exchanger including a passageway to effect communication between said manifold and said carburetor, and constituting an expansion chamber, and heating means in said chamber, including a pair of annular containers in communication with each other and spaced one within the other and establishing inner and outer surfaces of said expansion chamber.

2. A heat exchanger to be located between the carburetor and intake manifold of an internal combustion engine having a circulating system for a liquid coolant, said heat exchanger including a first passageway to effect communication between said manifold and said carburetor, a second passageway including inlet and outlet ends to be connected to said system, said passageways including portions disposed in heat exchanging relationship to each other, and a valve controlled air intake in communication with said first passageway between the heat exchanging portions and the carburetor side of said second passageway.

3. A heat exchanger to be located between the carburetor and intake manifold of an internal combustion engine having a circulating system for a liquid coolant, said heat exchanger including a first passageway to effect communication between said manifold and said carburetor, a second passageway including inlet and outlet ends to be connected to said system, said passageways including portions disposed in heat exchanging relationship to each other, an air intake in communication with said first passageway between the heat exchanging portions and the carburetor side of said second passageway, and a valve in control of said air intake, said valve including a valve element movable between open and closed positions, and a spring yieldably urging said valve towards its open position, said valve element being moved towards its closed position by a predetermined sub-atmospheric pressure in said first passageway.

4. A heat exchanger to be located between the carburetor and intake manifold of an internal combustion engine having a liquid circulating cooling system, said heat exchanger including a body having a chamber open to said manifold and to said carburetor and being dimensioned relative thereto to provide an expansion chamber, a conduit having inlet and outlet ends to be connected to said system, and portions in said body establishing surfaces of said chamber against which fuel from the carburetor impinges thereby to be vaporized and expanded, and an air intake in communication with said chamber between said surfaces and the carburetor end of said body and including a valve operable in response to variations in the sub-atmospheric pressure in said chamber.

5. A heat exchanger to be located between the carburetor and intake manifold of an internal combustion engine having a liquid circulating cooling system, said heat exchanger including a body having a chamber open to said manifold and to said carburetor and being dimensioned relative thereto to provide an expansion chamber, and a conduit having inlet and outlet ends to be connected to said system, and first and second container portions in said body establishing surfaces of said chamber against which fuel from the carburetor impinges thereby to be vaporized and expanded, said first container portion being annular and second container portion being located centrally of said first container portion.

6. A heat exchanger to be located between the carburetor and intake manifold of an internal combustion engine having a liquid circulating cooling system, said heat exchanger including a body having a chamber open to said manifold and to said carburetor and being dimensioned relative thereto to provide an expansion chamber, and a conduit having inlet and outlet ends to be connected to said system, and first and second container portions in said body establishing surfaces of said chamber against which fuel from the carburetor impinges thereby to be vaporized and expanded, said first container portion being annular and having its chamber establishing surface inwardly inclined towards the manifold end of said exchanger and said second container portion being located centrally of said first container portion and including a conical portion having its apex disposed towards the carburetor end of said exchanger.

References Cited in the file of this patent

UNITED STATES PATENTS

| | | |
|---|---|---|
| 1,140,064 | Rakestraw | May 18, 1915 |
| 1,213,817 | Baruch | Jan. 30, 1917 |
| 1,249,119 | Klopp | Dec. 4, 1917 |
| 1,253,642 | Steere | Jan. 15, 1918 |
| 1,379,437 | Bennett | May 24, 1921 |
| 1,463,035 | Bennett | July 24, 1923 |
| 1,513,433 | Sherbondy | Oct. 28, 1924 |
| 1,706,242 | Markovetz | Mar. 19, 1929 |